Jan. 7, 1969  H. B. ELLEFSON  3,420,730

METHOD OF MAKING STAINED GLASS WINDOWS AND RESULTANT THEREOF

Filed Aug. 30, 1965

INVENTOR
Herbert B. Ellefson

BY Cecil L. Wood

ATTORNEY

INVENTOR
Herbert B. Ellefson

United States Patent Office 3,420,730
Patented Jan. 7, 1969

3,420,730
METHOD OF MAKING STAINED GLASS WINDOWS AND RESULTANT THEREOF
Herbert B. Ellefson, 1411 Juanita Drive,
Arlington, Tex. 76010
Filed Aug. 30, 1965, Ser. No. 483,406
U.S. Cl. 161—38        4 Claims
Int. Cl. B32b *17/06;* B44f *1/06*

ABSTRACT OF THE DISCLOSURE

A method of making a mosaic window which includes use of a plurality of removable nylon cords for separating glass mosaic units that are attached to a base plate of glass along their boundary edges to provide expansion joints to prevent cracking.

---

Figure 1:
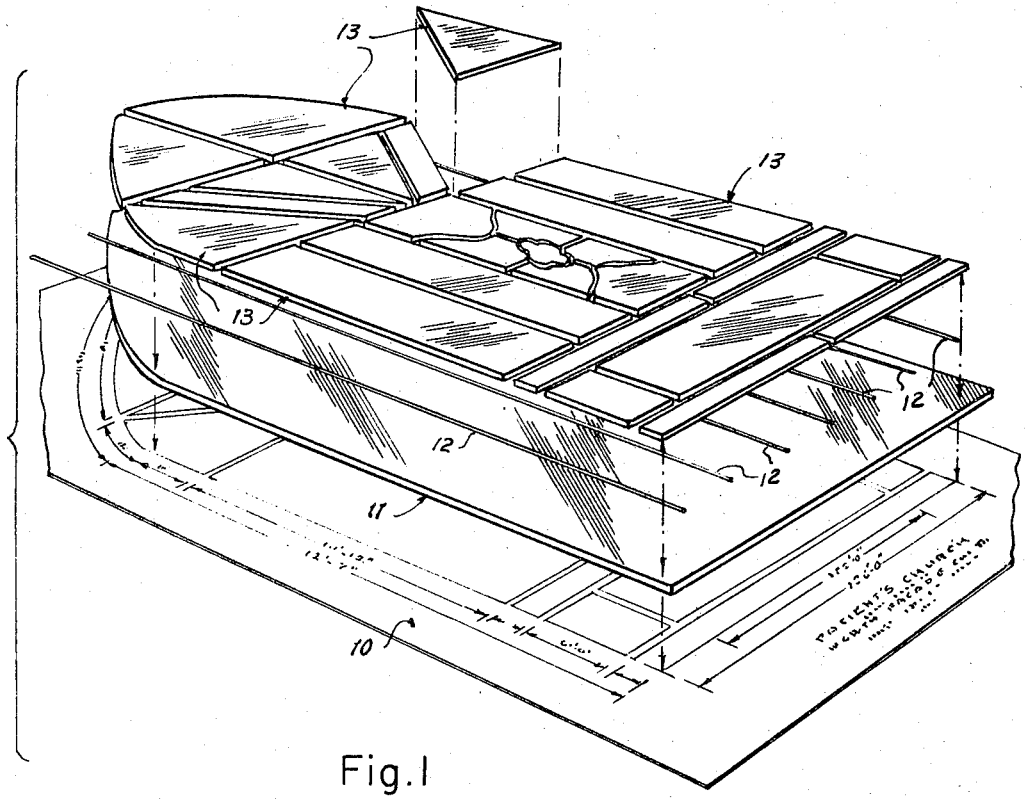

This invention relates to a method of forming simulated stained glass windows, and it has particular reference to certain specific improvements in a method as hereinafter described for forming composite, laminated window structures simulating stained glass windows of antiquity.

In the design and fabrication of ornamental stained glass windows for churches, cathedrals, memorials, and the like, some of which are valued because of their artistic merit and their craftsmanship, it has long been the practice to arrange numerous small, fragmentary pieces of glass of selected sizes and shapes, and of different colors and having varying thicknesses, in mosaic fashion according to a predetermined pattern, and to join the individual pieces along their boundary edges by applying thereto strips of wrought metal, such as lead, to form a rigid, unitary composite structure characterized by its strength and adapted to support its weight and to resist such stresses and strains as may be applied thereto.

More recently windows having a laminated structure and consisting essentially of a piece of clear glass characterized by its strength, such as plate glass, having other, relatively smaller pieces of glass of selected sizes, shapes, colors, and thicknesses arranged upon one side thereof in accordance with a predetermined pattern, said last mentioned pieces being joined to each other and to said first mentioned piece along the boundary edges of said last mentioned pieces by strips of molded plastic material, have been manufactured and sold extensively in imitation of and in competition with conventional stained glass windows as above described.

While composite, laminated window structures as described are adapted to be produced inexpensively and in large numbers and provide low cost substitutes for conventional stained glass windows, it has been found that because of differences in their coefficients of expansion relative to each other, and relative to the plate glass to which they are joined along their boundary edges, and the direct contact and resulting heat transfer between opposing surfaces of the juxtaposed pieces of glass, the smaller pieces may break or crack, thereby spoiling the appearance of the window.

A prime object of the invention is that of providing an improved composite, laminated window structure as described in which the several smaller pieces of glass are spaced apart from the plate glass to which they are joined along their boundary edges, and are connected thereto only by the strips of molded plastic material, which advantageously may be a poor conductor of heat as well as providing expansion joints between opposing and adjoining pieces of glass, whereby breaking and cracking of the glass may be effectively avoided.

A further object of the invention resides in the provision of an improved composite, laminated window structure as described having sealed dead air spaces between opposing surfaces of the smaller pieces of glass and the plate glass to which they are joined along their boundary edges, said dead air spaces effectively insulating said structure against the transfer of heat through it from one side to the other, so that the improved structure is actually better than a conventional stained glass window rather than a substitute therefor.

Broadly, the invention contemplates an improved method of forming a composite, laminated window structure as described which comprises the step of separating the plate glass initially from the smaller pieces of glass which are arranged thereon by a row of nylon cords which extend across the plate glass, between the plate glass and said smaller pieces, in parallel, spaced apart relation to each other, after which the smaller pieces are joined to each other and to the plate glass along the boundary edges of the smaller pieces by strips of molded plastic material, the molded plastic material is allowed to set, and finally the nylon cords, which are self lubricating and do not adhere to the molded plastic material, are withdrawn.

While the foregoing objects are paramount, other and lesser objects will become apparent as the description proceeds, when considered in connection with the appended drawings wherein:

FIGURE 1 is an exploded perspective view showing the pattern, the plate glass arranged upon the pattern, the nylon cords extending across the plate glass, and the smaller pieces of glass corresponding to the pattern arranged upon the plate glass and separated therefrom initially by the nylon cords, preparatory to joining the smaller pieces to each other and to the plate glass along the boundary edges of the smaller pieces by strips of molded plastic material.

Figure 2:
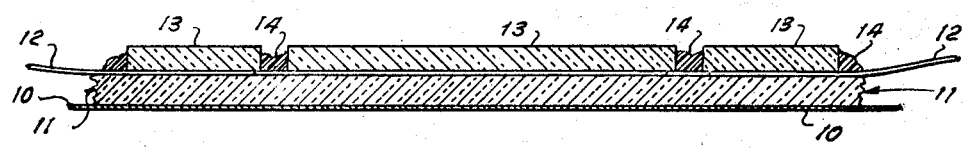

FIGURE 2 is a sectional view showing the pattern, the plate glass, the nylon cords, and the smaller pieces of glass arranged one above the other, and showing the molded plastic material whereby the smaller pieces are joined to each other and to the plate glass along the boundary edges of the smaller pieces.

Figure 3:
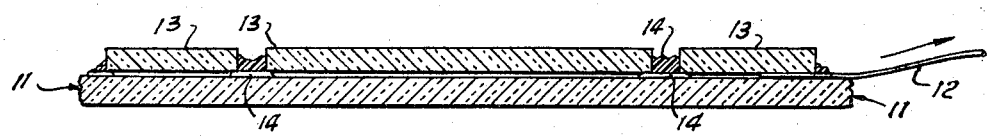
Figure 4:
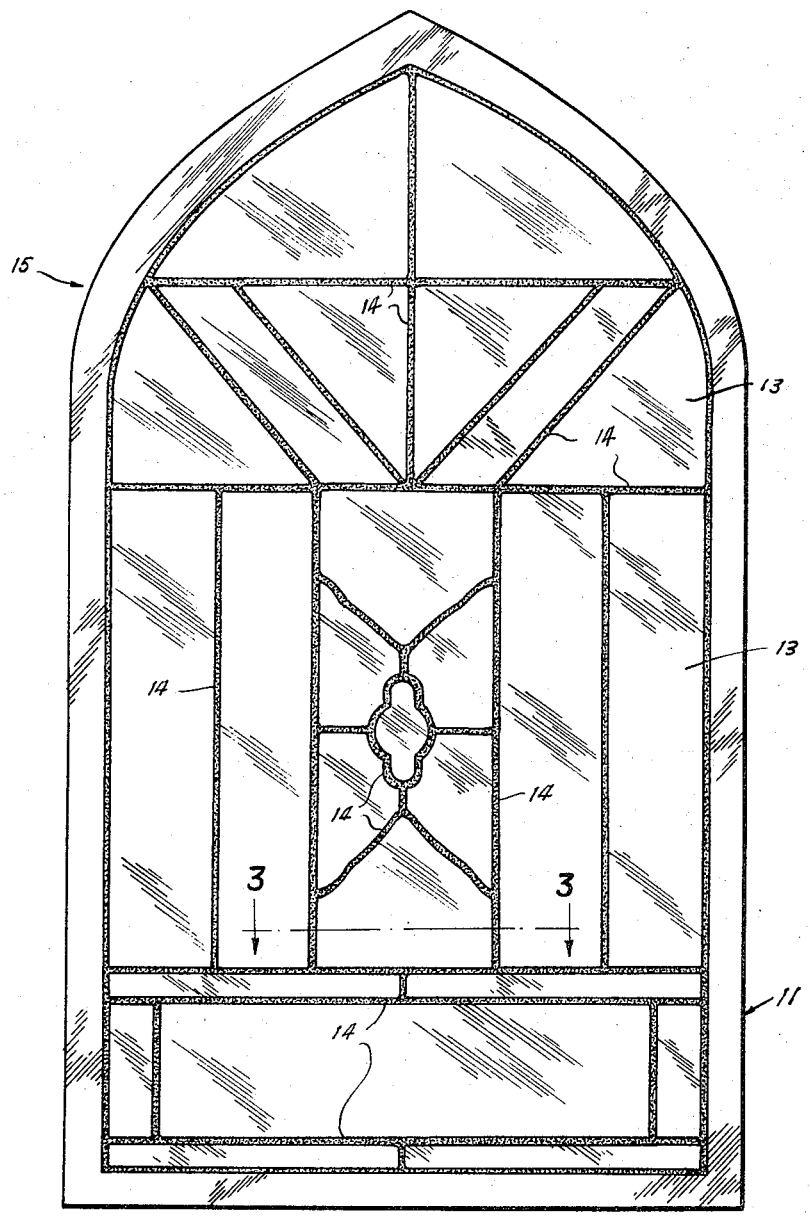

FIGURE 3 is a view similar to FIGURE 2, showing how the molded plastic material is applied to the surface of the plate glass, between the plate glass and the smaller pieces of glass which are arranged thereon, and between the boundary edges of the smaller pieces, as seen along a section line extending between two adjacent nylon cords, and FIGURE 4 shows one side of the completed window structure, with the molded plastic strips in place and with the nylon cords withdrawn.

As illustrated in FIGURE 1 of the drawing, in carrying out the method of the invention a drawing or pattern, designated generally by the numeral 10, is first arranged horizontally upon a supporting surface (not shown), and a piece of plate glass, indicated by the numeral 11, which has dimensions corresponding to those of a finished window and is similarly shaped, is arranged upon the pattern 10 in juxtaposed relation thereto.

A plurality of nylon cords are arranged upon the plate glass 11 in parallel, spaced apart relation to each other, with their opposite end portions extending beyond the corresponding edges of the plate glass 11, and thereafter a plurality of relatively smaller pieces of glass 13, of selected sizes, shapes, colors, and thicknesses are arranged upon the nylon cords 12, in spaced apart relation to the plate glass 11, according to a predetermined pattern as illustrated in the drawing 10.

The smaller pieces of glass 13 are joined to each other and to the plate glass 11 along the boundary edges of the smaller pieces 13, while supported on the nylon cords 12 in spaced apart relation to the plate glass 11, by strips of molded plastic material 14.

The molded plastic material 14 advantageously may consist, for example, of an epoxy resin characterized by its toughness and having a degree of resilience and elasticity.

In a final step, after the strips of molded plastic material 14 have been allowed to set, the nylon cords 12 are withdrawn from their positions between the plate glass 11 and the smaller pieces of glass 13, in which they traverse the strips of molded plastic material 14, by pulling the exposed end portions of the nylon cords 12, leaving the smaller pieces of glass 13 supported on the strips of molded plastic material 14 in spaced apart relation to the plate glass 11.

In the finished window structure, shown in FIGURE 4 and designated generally by the numeral 15, the strips of molded plastic material 14, with the plate glass 11 and the smaller pieces of glass 13, form sealed dead air spaces between the opposing surfaces of the plate glass 11 and the smaller pieces of glass 13 whereby the window structure 15 is insulated against the transfer of heat through it from one side to the other.

The invention may be modified within certain limitations by persons skilled in the art without departing from the spirit and intent thereof or the scope of the appended claims.

What is claimed is:

1. A method of forming a composite, laminated window structure simulating a stained glass window which comprises arranging a drawing forming a pattern for the window upon a supporting surface, arranging a piece of plate glass having dimensions corresponding to those of the window, and similarly shaped, upon the pattern in juxtaposed relation thereto, arranging a plurality of nylon cords upon the plate glass in parallel, spaced apart relation to each other, with their opposite end portions extending beyond the corresponding edges of the plate glass, arranging a plurality of relatively smaller pieces of glass of selected sizes, shapes, colors, and thicknesses upon the nylon cords, in spaced apart relation to the plate glass, according to said pattern, joining the smaller pieces of glass to each other and to the plate glass along the boundary edges of the smaller pieces, while supported on the nylon cords in spaced apart relation to the plate glass, by strips of molded plastic material, allowing the strips of molded plastic material to set, and finally withdrawing the nylon cords from their positions between the plate glass and the smaller pieces of glass, in which they traverse the strips of molded plastic material, by pulling the exposed end portions of the nylon cords, leaving the smaller pieces of glass supported on the strips of molded plastic material in spaced apart relation to the plate glass.

2. A composite, laminated window structure simulating a stained glass window comprising a piece of clear glass characterized by its strength having other, relatively smaller pieces of glass of selected sizes, shapes, colors, and thicknesses arranged upon one side thereof in accordance with a predetermined pattern, said last mentioned pieces being joined to each other and to said first mentioned piece along the boundary edges of said last mentioned pieces, in spaced apart relation to said first mentioned piece, by strips of molded plastic material.

3. The structure of claim 2, said strips of molded plastic material forming, with said first and last mentioned pieces of glass, sealed dead air spaces between said first and last mentioned pieces of glass whereby the finished window is insulated against the transfer of heat through it from one side to the other.

4. The structure of claim 2, said first and last mentioned pieces of glass being spaced apart from each other and said molded plastic material being a poor conductor of heat whereby said first and last mentioned pieces of glass are insulated thermally from each other and breaking and cracking of said last mentioned pieces due to heat is effectively prevented.

References Cited

FOREIGN PATENTS 18,952    10/1900    Great Britain.

JACOB H. STEINBERG, *Primary Examiner.*

U.S. Cl. X.R.

52—309, 311; 156—63; 161—3